US012750769B2

(12) United States Patent
Song et al.

(10) Patent No.: US 12,750,769 B2
(45) Date of Patent: Sep. 29, 2026

(54) METHODS AND APPARATUSES FOR FACILITATING NETWORK SLICE SELECTION

(71) Applicant: Telefonaktiebolaget LM Ericsson (publ), Stockholm (SE)

(72) Inventors: Qiong Song, Shanghai (CN); Chengchun Zhuo, Shanghai (CN); Stefan Rommer, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 325 days.

(21) Appl. No.: 18/573,199

(22) PCT Filed: Jul. 6, 2021

(86) PCT No.: PCT/CN2021/104700

§ 371 (c)(1),
(2) Date: Dec. 21, 2023

(87) PCT Pub. No.: WO2023/279256

PCT Pub. Date: Jan. 12, 2023

(65) Prior Publication Data

US 2025/0294436 A1 Sep. 18, 2025

(51) Int. Cl.
*H04W 48/18* (2009.01)
*H04W 48/08* (2009.01)

(52) U.S. Cl.
CPC ........... *H04W 48/18* (2013.01); *H04W 48/08* (2013.01)

(58) Field of Classification Search
CPC ...... H04L 67/53; H04W 48/08; H04W 48/17; H04W 48/18; H04W 88/14
USPC ........................................................ 455/434
See application file for complete search history.

(56) References Cited

U.S. PATENT DOCUMENTS

| | | | | |
|---|---|---|---|---|
| 2019/0230556 | A1 | 7/2019 | Lee | |
| 2019/0268835 | A1 * | 8/2019 | Shan | H04W 48/16 |
| 2020/0267554 | A1 * | 8/2020 | Faccin | H04W 12/06 |
| 2020/0322879 | A1 | 10/2020 | Zhu et al. | |
| 2021/0136602 | A1 | 5/2021 | Pokkunuri et al. | |
| 2021/0168705 | A1 | 6/2021 | Fiorese et al. | |

(Continued)

FOREIGN PATENT DOCUMENTS

CN 109511136 A 3/2019

OTHER PUBLICATIONS

Huawei, et al., "C4-186107: Corrections to NSSAI Availability Service Operations," 3GPP TSG CT WG4 Meeting #86, Aug. 20-24, 2018, West Palm Beach, Florida, 12 pages.

(Continued)

*Primary Examiner* — Hirdepal Singh
(74) *Attorney, Agent, or Firm* — Withrow & Terranova, PLLC

(57) ABSTRACT

Methods and apparatuses for facilitating network slice selection are disclosed. According to an embodiment, a service consumer sends, to a service provider, a request for subscribing to a notification of a change in network slice selection assistance information (NSSAI) availability information. The request indicates that the notification is to be subscribed to for all tracking area identifiers (TAIs) supported by an access and mobility management function (AMF) set. The service consumer receives, from the service provider, a response to the request.

16 Claims, 9 Drawing Sheets

(56) References Cited

U.S. PATENT DOCUMENTS

2022/0330139 A1* 10/2022 Lee ........................ H04W 60/00
2022/0394566 A1* 12/2022 Liu ................... H04W 36/0033

OTHER PUBLICATIONS

Huawei, "C4-204404: Subscription modification," 3GPP TSG-CT WG4 Meeting #99e, Aug. 20-24, 2020, Electronic Meeting, 8 pages.
Huawei, "C4-211554: OpenAPI Reference," 3GPP TSG-CT WG4 Meeting #103-e, Feb. 24-Mar. 5, 2021, Electronic Meeting, 7 pages.
Extended European Search Report for European Patent Application No. 21948755.0, mailed Feb. 24, 2025, 13 pages.
Author Unknown, "Technical Specification Group Services and System Aspects; System architecture for the 5G System (5GS); Stage 2 (Release 17)," Technical Specification 23.501, Version 17.0.0, Mar. 2021, 3GPP Organizational Partners, 489 pages.
Author Unknown, "Technical Specification Group Services and System Aspects; System architecture for the 5G System (5GS); Stage 2 (Release 17)," Technical Specification 23.501, Version 17.1.1, Jun. 2021, 3GPP Organizational Partners, 526 pages.
Author Unknown, "Technical Specification Group Core Network and Terminals; 5G System; Network Function Repository Services; Stage 3 (Release 17)," Technical Specification 29.510, Version 17.2.0, Jun. 2021, 3GPP Organizational Partners, 256 pages.
Author Unknown, "Technical Specification Group Core Network and Terminals; 5G System; Network Slice Selection Services; Stage 3 (Release 17)," Technical Specification 29.531, Version 17.0.0, Mar. 2021, 3GPP Organizational Partners, 77 pages.
Author Unknown, "Technical Specification Group Radio Access Network; NG-RAN; NG Application Protocol (NGAP) (Release 16)," Technical Specification 38.413, Version 16.5.0, Apr. 2021, 3GPP Organizational Partners, 473 pages.
Huawei, "C4-191176: Add AMFset in NssaiAvailabilityInfo," 3GPP TSG-CT WG4 Meeting #90, Apr. 8-12, 2019, Xi'an, China, 9 pages.
International Search Report and Written Opinion for International Patent Application No. PCT/CN2021/104700, mailed Apr. 6, 2022, 7 pages.

* cited by examiner

METHODS AND APPARATUSES FOR FACILITATING NETWORK SLICE SELECTION

This application is a 35 U.S.C. § 371 national phase filing of International Application No. PCT/CN2021/104700, filed Jul. 6, 2021, the disclosure of which is incorporated herein by reference in its entirety.

TECHNICAL FIELD

Embodiments of the disclosure generally relate to communication, and, more particularly, to methods and apparatuses for facilitating network slice selection.

BACKGROUND

This section introduces aspects that may facilitate better understanding of the present disclosure. Accordingly, the statements of this section are to be read in this light and are not to be understood as admissions about what is in the prior art or what is not in the prior art.

According to the definition of network slice as provided in 3rd generation partnership project (3GPP) technical specification (TS) 23.501 V17.1.1, a network may, for a common service area, include a multitude of access and mobility management function (AMF) sets supporting different sets of single network slice selection assistance informations (S-NSSAIs). For the same service area, the radio access network (RAN) may include next generation node Bs (gNBs) serving different sets of S-NSSAIs per tracking area (TA). This means that RAN support of S-NSSAIs may, for a given area, be either homogeneous or inhomogeneous. FIG. 1 illustrates an exemplary deployment of a communication network using network slicing. As shown, Network Slice "A" is homogeneously supported in the common service area. The other Network Slices "B", "C" and "D" has inhomogeneous support in the common service area.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for facilitating network slice selection. In particular, one of the problems to be solved by the disclosure is that the existing solution for subscription of a notification of a change in NSSAI availability information is not optimized. Another problem to be solved by the disclosure is that the existing solution for query of target AMF(s) in handover procedure may lead to an inappropriate query result.

According to a first aspect of the disclosure, there is provided a method performed by a service consumer. The method may comprise sending, to a service provider, a request for subscribing to a notification of a change in network slice selection assistance information (NSSAI) availability information. The request may indicate that the notification is to be subscribed to for all tracking area identifiers (TAIs) supported by an AMF set. The method may further comprise receiving, from the service provider, a response to the request.

In this way, it is possible to prevent the service consumer from making the subscription time and again based on new TAIs thereby simplifying the subscription operation and optimizing the signaling.

In an embodiment of the disclosure, the request may comprise an indicator indicating that the notification is to be subscribed to for all TAIs supported by the AMF set.

In an embodiment of the disclosure, the service consumer may be an AMF in the AMF set.

In an embodiment of the disclosure, the service consumer may be an AMF in another AMF set different than the AMF set.

In an embodiment of the disclosure, the service provider may be a network slice selection function (NSSF).

According to a second aspect of the disclosure, there is provided a method performed by a service provider. The method may comprise receiving, from a service consumer, a request for subscribing to a notification of a change in NSSAI availability information. The request may indicate that the notification is to be subscribed to for all TAIs supported by an AMF set. The method may further comprise sending, to the service consumer, a response to the request.

In this way, it is possible to prevent the service consumer from making the subscription time and again based on new TAIs thereby simplifying the subscription operation and optimizing the signaling.

In an embodiment of the disclosure, the request may comprise an indicator indicating that the notification is to be subscribed to for all TAIs supported by the AMF set.

In an embodiment of the disclosure, the service consumer may be an AMF in the AMF set.

In an embodiment of the disclosure, the service consumer may be an AMF in another AMF set different than the AMF set.

In an embodiment of the disclosure, the service provider may be an NSSF.

According to a third aspect of the disclosure, there is provided a method performed by a network repository function (NRF). The method may comprise receiving, from a first service consumer, information about one or more S-NSSAIs supported by the first service consumer for each of one or more tracking areas (TAs). The method may further comprise maintaining the received information.

In this way, it is possible to appropriately implement the query of target service consumer(s) by always querying the NRF.

In an embodiment of the disclosure, the information may be received and maintained for each of a plurality of first service consumers.

In an embodiment of the disclosure, the received information may comprise: one or more TAIs identifying the one or more TAs; and the one or more S-NSSAIs supported by the first service consumer for each of the one or more TAs.

In an embodiment of the disclosure, a number of the one or more TAIs may be more than one. The more than one TAI may be represented by a list of multiple TAIs or a list of one or more TAI ranges.

In an embodiment of the disclosure, the method may further comprise receiving, from a second service consumer, a request for querying one or more target service consumers for a target TA. The method may further comprise determining a response to the request, based on the maintained information. The method may further comprise sending the determined response to the second service consumer.

In an embodiment of the disclosure, each of the first service consumer and the second service consumer may be an AMF.

According to a fourth aspect of the disclosure, there is provided a method performed by a service consumer. The method may comprise sending, to an NRF, information about one or more S-NSSAIs supported by the service consumer for each of one or more TAs.

In this way, it is possible to appropriately implement the query of target service consumer(s) by always querying the NRF.

In an embodiment of the disclosure, the sent information may comprise: one or more TAIs identifying the one or more TAs; and the one or more S-NSSAIs supported by the service consumer for each of the one or more TAs.

In an embodiment of the disclosure, a number of the one or more TAIs may be more than one. The more than one TAI may be represented by a list of multiple TAIs or a list of one or more TAI ranges.

In an embodiment of the disclosure, the service consumer may be an AMF.

According to a fifth aspect of the disclosure, there is provided a method performed by a service consumer. The method may comprise sending, to an NSSF, a request for querying one or more target service consumers that support multiple target S-NSSAIs for a target TA. The request may indicate an order in which the multiple target S-NSSAIs are to be considered for query matching when the multiple target S-NSSAIs cannot be matched together. The method may further comprise receiving, from the NSSF, a response to the request.

In this way, it is possible to appropriately implement the query of target service consumer(s) by always querying the NSSF.

In an embodiment of the disclosure, the order may be indicated by an order in which the multiple target S-NSSAIs are sorted in the request.

In an embodiment of the disclosure, the request may comprise multiple indicators each of which indicates a priority of one of the multiple target S-NSSAIs that is to be considered for query matching when the multiple target S-NSSAIs cannot be matched together.

In an embodiment of the disclosure, the lower value an indicator has, the higher priority a target S-NSSAI may have.

In an embodiment of the disclosure, the order may be based on which protocol data unit (PDU) session(s) served by the service consumer are currently active.

In an embodiment of the disclosure, the service consumer may be an AMF.

According to a sixth aspect of the disclosure, there is provided a method performed by an NSSF. The method may comprise receiving, from a service consumer, a request for querying one or more target service consumers that support multiple target S-NSSAIs for a target TA. The request may indicate an order in which the multiple target S-NSSAIs are to be considered for query matching when the multiple target S-NSSAIs cannot be matched together. The method may further comprise determining a response to the request. The method may further comprise sending the response to the service consumer.

In this way, it is possible to appropriately implement the query of target service consumer(s) by always querying the NSSF.

In an embodiment of the disclosure, the response may be determined based on the indicated order.

In an embodiment of the disclosure, the order may be indicated by an order in which the multiple target S-NSSAIs are sorted in the request.

In an embodiment of the disclosure, the request may comprise multiple indicators each of which indicates a priority of one of the multiple target S-NSSAIs that is to be considered for query matching when the multiple target S-NSSAIs cannot be matched together.

In an embodiment of the disclosure, the lower value an indicator has, the higher priority a target S-NSSAI may have.

In an embodiment of the disclosure, the service consumer may be an AMF.

According to a seventh aspect of the disclosure, there is provided a service consumer. The service consumer may comprise at least one processor and at least one memory. The at least one memory may contain instructions executable by the at least one processor, whereby the service consumer may be operative to send, to a service provider, a request for subscribing to a notification of a change in NSSAI availability information. The request may indicate that the notification is to be subscribed to for all TAIs supported by an AMF set. The service consumer may be further operative to receive, from the service provider, a response to the request.

In an embodiment of the disclosure, the service consumer may be operative to perform the method according to the above first aspect.

According to an eighth aspect of the disclosure, there is provided a service provider. The service provider may comprise at least one processor and at least one memory. The at least one memory may contain instructions executable by the at least one processor, whereby the service provider may be operative to receive, from a service consumer, a request for subscribing to a notification of a change in NSSAI availability information. The request may indicate that the notification is to be subscribed to for all TAIs supported by an AMF set. The service provider may be further operative to send, to the service consumer, a response to the request.

In an embodiment of the disclosure, the service provider may be operative to perform the method according to the above second aspect.

According to a ninth aspect of the disclosure, there is provided an apparatus implementing an NRF. The apparatus may comprise at least one processor and at least one memory. The at least one memory may contain instructions executable by the at least one processor, whereby the apparatus may be operative to receive, from a first service consumer, information about one or more S-NSSAIs supported by the first service consumer for each of one or more TAs. The apparatus may be further operative to maintain the received information.

In an embodiment of the disclosure, the apparatus may be operative to perform the method according to the above third aspect.

According to a tenth aspect of the disclosure, there is provided a service consumer. The service consumer may comprise at least one processor and at least one memory. The at least one memory may contain instructions executable by the at least one processor, whereby the service consumer may be operative to send, to an NRF, information about one or more S-NSSAIs supported by the service consumer for each of one or more TAs.

In an embodiment of the disclosure, the service consumer may be operative to perform the method according to the above fourth aspect.

According to an eleventh aspect of the disclosure, there is provided a service consumer. The service consumer may comprise at least one processor and at least one memory. The at least one memory may contain instructions executable by the at least one processor, whereby the service consumer may be operative to send, to an NSSF, a request for querying one or more target service consumers that support multiple target S-NSSAIs for a target TA. The request may indicate an order in which the multiple target S-NSSAIs are to be considered for query matching when the multiple target S-NSSAIs cannot be matched together. The service consumer may be further operative to receive, from the NSSF, a response to the request.

In an embodiment of the disclosure, the service consumer may be operative to perform the method according to the above fifth aspect.

According to a twelfth aspect of the disclosure, there is provided an apparatus implementing an NSSF. The apparatus may comprise at least one processor and at least one memory. The at least one memory may contain instructions executable by the at least one processor, whereby the apparatus may be operative to receive, from a service consumer, a request for querying one or more target service consumers that support multiple target S-NSSAIs for a target TA. The request may indicate an order in which the multiple target S-NSSAIs are to be considered for query matching when the multiple target S-NSSAIs cannot be matched together. The apparatus may be further operative to determine a response to the request. The apparatus may be further operative to send the response to the service consumer.

In an embodiment of the disclosure, the apparatus may be operative to perform the method according to the above sixth aspect.

According to a thirteenth aspect of the disclosure, there is provided a computer program product. The computer program product may contain instructions which when executed by at least one processor, cause the at least one processor to perform the method according to any of the above first to sixth aspects.

According to a fourteenth aspect of the disclosure, there is provided a computer readable storage medium. The computer readable storage medium may store thereon instructions which when executed by at least one processor, cause the at least one processor to perform the method according to any of the above first to sixth aspects.

According to a fifteenth aspect of the disclosure, there is provided a service consumer. The service consumer may comprise a sending module for sending, to a service provider, a request for subscribing to a notification of a change in NSSAI availability information. The request may indicate that the notification is to be subscribed to for all TAIs supported by an AMF set. The service consumer may further comprise a reception module for receiving, from the service provider, a response to the request.

According to a sixteenth aspect of the disclosure, there is provided a service provider. The service provider may comprise a reception module for receiving, from a service consumer, a request for subscribing to a notification of a change in NSSAI availability information. The request may indicate that the notification is to be subscribed to for all TAIs supported by an AMF set. The service provider may further comprise a sending module for sending, to the service consumer, a response to the request.

According to a seventeenth aspect of the disclosure, there is provided an apparatus implementing an NRF. The apparatus may comprise a reception module for receiving, from a first service consumer, information about one or more S-NSSAIs supported by the first service consumer for each of one or more TAs. The apparatus may further comprise a maintaining module for maintaining the received information.

According to an eighteenth aspect of the disclosure, there is provided a service consumer. The service consumer may comprise a sending module for sending, to an NRF, information about one or more S-NSSAIs supported by the service consumer for each of one or more TAs.

According to a nineteenth aspect of the disclosure, there is provided a service consumer. The service consumer may comprise a sending module for sending, to an NSSF, a request for querying one or more target service consumers that support multiple target S-NSSAIs for a target TA. The request may indicate an order in which the multiple target S-NSSAIs are to be considered for query matching when the multiple target S-NSSAIs cannot be matched together. The service consumer may further comprise a reception module for receiving, from the NSSF, a response to the request.

According to a twentieth aspect of the disclosure, there is provided an apparatus implementing an NSSF. The apparatus may comprise a reception module for receiving, from a service consumer, a request for querying one or more target service consumers that support multiple target S-NSSAIs for a target TA. The request may indicate an order in which the multiple target S-NSSAIs are to be considered for query matching when the multiple target S-NSSAIs cannot be matched together. The apparatus may further comprise a determination module for determining a response to the request. The apparatus may further comprise a sending module for sending the response to the service consumer.

According to a twenty-first aspect of the disclosure, there is provided a method implemented in a communication system including a service consumer and a service provider. The method may comprise all steps of the methods according to the above first and second aspects.

According to a twenty-second aspect of the disclosure, there is provided a communication system. The communication system may comprise a service consumer according to the above seventh or fifteenth aspect and a service provider according to the above eighth or sixteenth aspect.

According to a twenty-third aspect of the disclosure, there is provided a method implemented in a communication system including an NRF and a service consumer. The method may comprise all steps of the methods according to the above third and fourth aspects.

According to a twenty-fourth aspect of the disclosure, there is provided a communication system. The communication system may comprise an apparatus implementing an NRF according to the above ninth or seventeenth aspect and a service consumer according to the above tenth or eighteenth aspect.

According to a twenty-fifth aspect of the disclosure, there is provided a method implemented in a communication system including a service consumer and an NSSF. The method may comprise all steps of the methods according to the above fifth and sixth aspects.

According to a twenty-sixth aspect of the disclosure, there is provided a communication system. The communication system may comprise a service consumer according to the above eleventh or nineteenth aspect and an apparatus implementing an NSSF according to the above twelfth or twentieth aspect.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
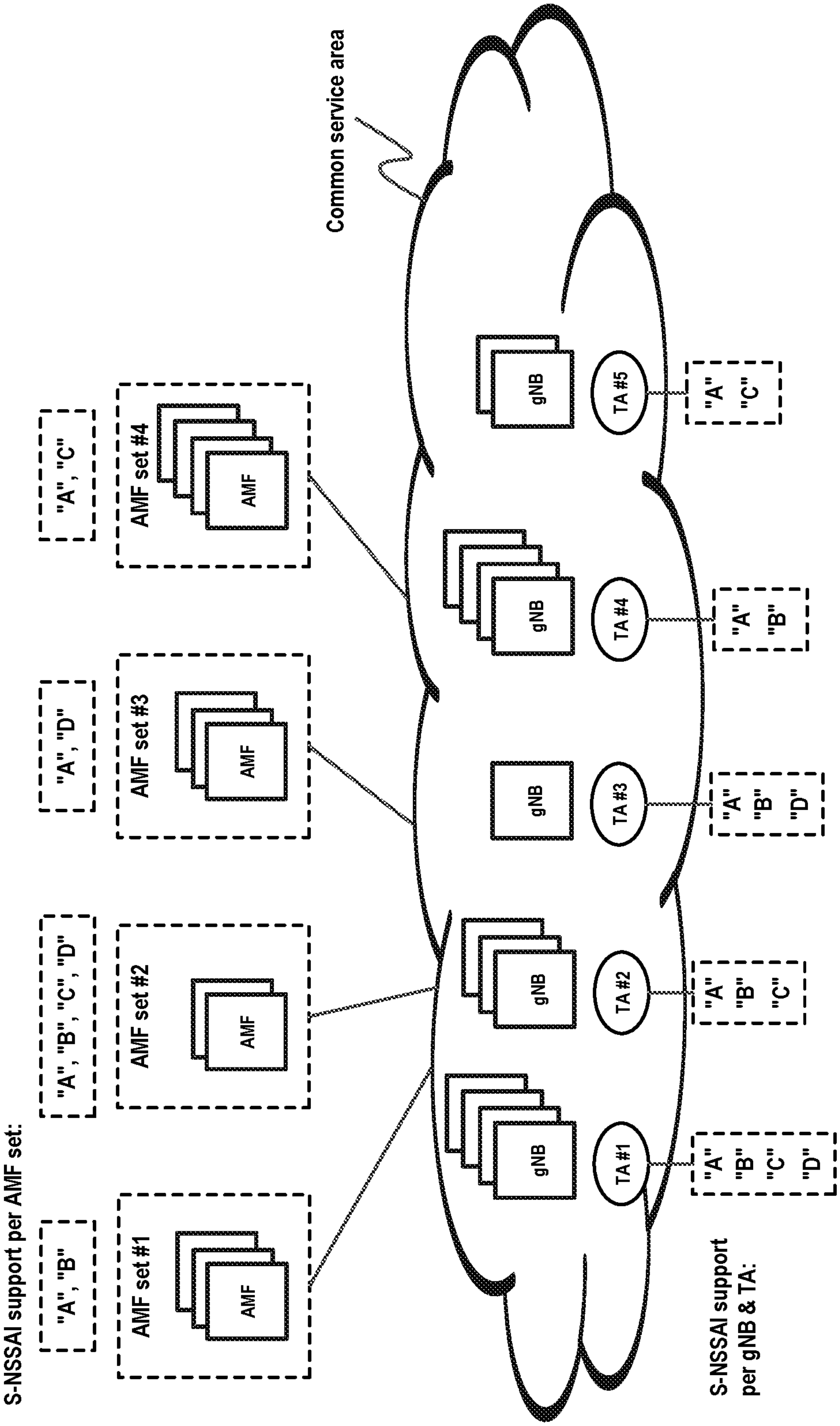
FIG. 1 is a diagram illustrating the support for network slice by AMF set and gNB.
Figure 2:
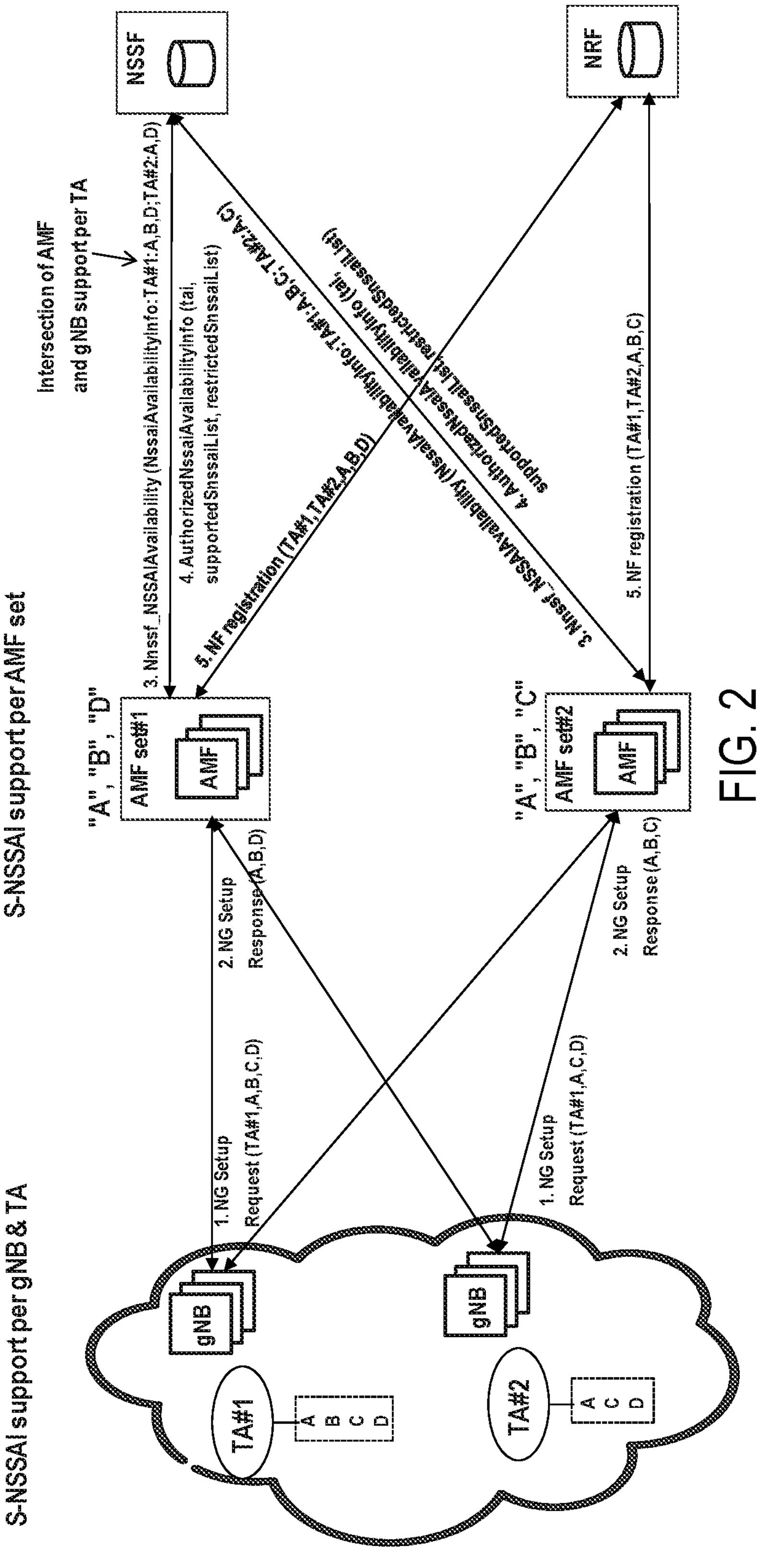
FIG. 2 is a diagram illustrating an exemplary process for network setup.

FIG. 2 illustrates an exemplary process for network setup. At step 1, the gNB corresponding to TA #1 sends a next generation (NG) Setup Request to AMF set #1 (e.g. to each AMF in AMF set #1) and to AMF set #2 (e.g. to each AMF in AMF set #2) respectively. The NG Setup Request indicates the support for S-NSSAIs A, B, C and D by TA #1. Similarly, the gNB corresponding to TA #2 sends an NG Setup Request to AMF set #1 and to AMF set #2 respectively. The NG Setup Request indicates the support for S-NSSAIs A, C and D by TA #2. At step 2, AMF set #1 (e.g. each AMF in AMF set #1) sends an NG Setup Response to the gNB corresponding to TA #1 and the gNB corresponding to TA #2. The NG Setup Response indicates the support for S-NSSAIs A, B and D by AMF set #1. Similarly, AMF set #2 (e.g. each AMF in AMF set #2) sends an NG Setup Response to the gNB corresponding to TA #1 and the gNB corresponding to TA #2. The NG Setup Response indicates the support for S-NSSAIs A, B and C by AMF set #2.

The AMF can determine an intersection of AMF support and gNB support per TA. As a result, at step 3, AMF set #1 (e.g. each AMF in AMF set #1) sends, to the NSSF, NSSAI availability information indicates the determined intersection (TA #1: A, B, D; TA #2: A, D). Similarly, AMF set #2 (e.g. each AMF in AMF set #2) sends, to the NSSF, NSSAI availability information indicates the determined intersection (TA #1: A, B, C; TA #2: A, C). At step 4, the NSSF sends corresponding authorized NSSAI availability information to AMF set #1 and AMF set #2 respectively. At step 5, AMF set #1 (e.g. each AMF in AMF set #1) registers its NF profile (Supported TAs=TA #1, TA #2, Supported S-NSSAIs=A, B, D) to the NRF. Similarly, AMF set #2 (e.g. each AMF in AMF set #2) registers its NF profile (Supported TAs=TA #1, TA #2, Supported S-NSSAIs=A, B, C) to the NRF.

The AMF can, based on user equipment (UE) requested NSSAI, Subscribed S-NSSAIs, as well as deployed and permitted S-NSSAIs, decide whether the UE can be served by the AMF, possibly by another AMF (if at least one S-NSSAI cannot be served in the initial AMF), or not at all. Selection of another AMF can be performed by the NSSF, followed by an AMF re-allocation from the initial AMF to the selected target AMF (in case the requested NSSAI in current location may be served by another AMF Set). The NSSF may also decide to keep the initial AMF.

Figure 3:
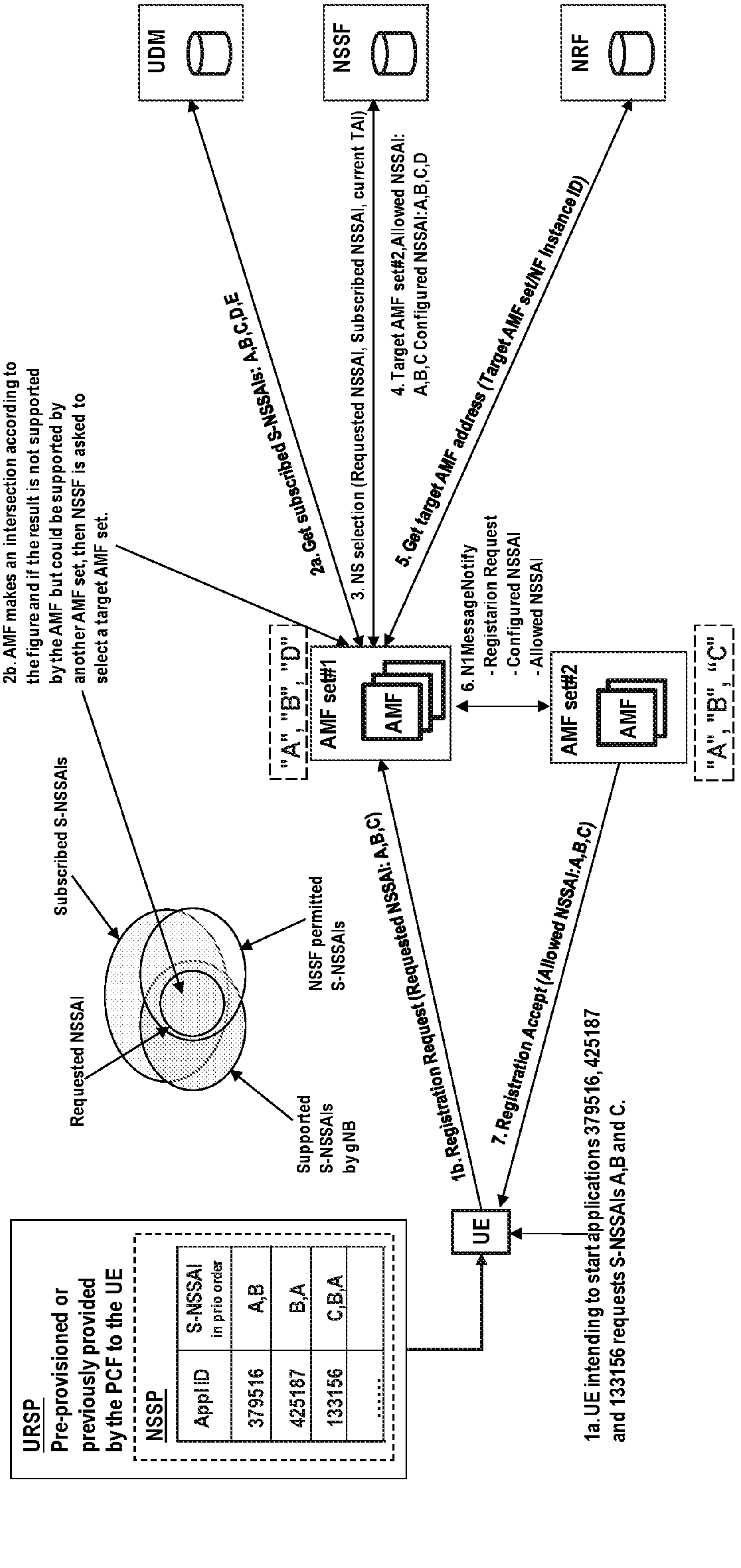
FIG. 3 is a diagram illustrating an exemplary process for selection of network slice and serving AMF set.

As an exemplary example, a process for selection of network slice and serving AMF set is shown in FIG. 3. The UE route selection policy (URSP) including the network slice selection policy (NSSP) may be pre-provisioned or previously provided by a policy control function (PCF) to the UE. At step 1a, the UE intending to start applications 379516, 425187 and 133156 requests S-NSSAIs A, B and C. At step 1b, the UE sends, to AMF set #1, a Registration Request indicating that Requested NSSAI is A, B, C. At step 2a, AMF set #1 gets the subscribed S-NSSAIs (A, B, C, D, E) from the unified data management (UDM). At step 2b, AMF set #1 makes an intersection as shown in the figure. If the result shows that the requested NSSAI is not supported by AMF set #1 but could be supported by another AMF set, then the NSSF is asked to select a target AMF set at step 3. Then, at step 4, the NSSF replies with the information about the selected target AMF set (AMF set #2). At step 5, AMF set #1 gets the address of the target AMF from the NRF. At step 6, AMF set #1 transfers the registration request from the UE to AMF set #2. At step 7, AMF set #2 sends, to the UE, a Registration Accept indicating that Allowed NSSAI is A, B, C.

According to 3GPP TS 29.531 V17.0.0, AMF can use Nnssf_NSSelection service to retrieve slice selection information which includes the allowed NSSAI, configured NSSAI, target AMF set or the list of candidate AMF(s) for a UE. AMF can also subscribe a notification of any changes in status of the NSSAI availability information (e.g. S-NSSAIs available per TA and the restricted S-NSSAI(s) per PLMN in that TA in the serving PLMN of the UE) upon this is updated by another AMF.

For example, AMF can subscribe a notification in below scenarios:

a) AMF can cache the AuthorizedNetworkSliceInfo in the NSSelection procedure to optimize the signaling for each NSSelection. Then, AMF needs to subscribe a notification of the AuthorizedNssaiAvailabilityData in order to update local cache timely. AMF can subscribe a notification primarily related to S-NSSAIs supported for those TAs that the AMF serves itself.

b) The customer selects only one AMF within an AMF set to update the S-NSSAI(s) the AMF supports on a per TA basis to NSSF, while other AMFs within this AMF set just subscribes the notification event and gets the AuthorizedNssaiAvailabilityData per TAI & AMF set for the subsequent NSSelection. AMF can subscribe a notification primarily related to S-NSSAIs supported for those TAs that the AMF serves itself.

c) During inter-AMF handover, source AMF can query NSSF to find a target AMF set which can serve the UE registered S-NSSAIs and target TAI, since only NSSF has the knowledge of the supported S-NSSAIs per TAI. Without support for querying NSSF, the selection of target AMF is purely based on target TAI through NRF discovery. In this case, it will not be possible to select a particular target AMF Set based on the UE's registered S-NSSAIs. With multiple AMF sets at the target location, it is possible that a target AMF set is selected that does not support any of the UE's registered S-NSSAIs, resulting in a failure as a consequence. Then, subscribing other TAs served by other AMF sets is helpful for optimizing the signaling in handover procedure.

In addition, when NSSF has some local policy changed (e.g., updates the restricted S-NSSAIs per public land mobile network (PLMN) in a TA for roaming scenario), the NSSF shall notify the AMF with any change in status, on a per TA basis, of the S-NSSAIs available per TA (unrestricted) and the S-NSSAIs restricted per PLMN in that TA in the serving PLMN.

There are three problems in the existing solutions. Firstly, for case a) and case b), currently, as defined in 3GPP TS 29.531 V17.0.0, AMF can subscribe a notification primarily related to S-NSSAIs supported for those TAs that the AMF serves itself. As defined in chapter 6.2.6.2.8 NssfEventSubscriptionCreateData, the attribute "taiRangeList" or "taiList" is mandatory.

The first problem is that AMF always uses the newly stored S-NSSAI(s) support per TAI as received in the NG Setup message or RAN configuration update, performs an intersection of the RAN supported S-NSSAI(s) per TAI and the supported S-NSSAI(s) configured in the AMF, then updates to NSSF. Since TAI is stored based on NG setup procedure which is dynamic, this means the AMF should subscribe the event or modify a subscription time and again based on new stored TAIs.

Secondly, based on the current approach defined in 3GPP TS 29.531 V17.0.0, AMF subscribes to a notification of the NSSAI availability information based on the attribute TAIlist. For example, in the network deployment shown in FIG. 2, AMF set #1 subscribes the status of the NSSAI availability in TA #1. TA #1 is served by AMF set #1 and AMF set #2. If AMF set #2 changes the supported S-NSSAIs from "A", "B", "C" to "A", "B", "C", "D", then NSSF will include authorized S-NSSAIs for TA #1 as "A", "B", "C", "D" in AuthorizedNssaiAvailabilityData (which does not include the AMF set #2 information) in NssfEventNotification. Thus, AMF set #1 does not know the authorized S-NSSAIs "A", "B", "C", "D" correspond to which AMF sets since AMF set #1 does not support "C". When a UE requests "A", "B", "C", "D", AMF set #1 still does not know which AMF set can serve the UE (there also may be AMF set #3 supporting "A", "B"). Thus, AMF set #1 still needs to query NSSF. This means the subscribed service actually does not help.

To solve the above second problem based on the current approach, AMF should subscribe based on TAIlist and AMF set. Then, AMF could identify the supported S-NSSAIs per TAI & AMF set. However, this solution would result in a complex implementation for AMF to subscribe a notification. This is because when AMF subscribes the event per TAIlist, AMF does not know whether all the TAIs in the TAIlist are supported by other AMF sets. Note that the AMF can only get other AMF sets' information based on the NSSelection procedure. During the first NSSelection procedure, NSSF will respond with a target AMF set which can serve the UE requested NSSAI and the current UE's TAI. For example, AMF set #1 can cache the NSSelection result for TA #1 & AMF set #2, and then subscribes the status of TA #1 & AMF set #2.

If AMF subscribes based on TAIlist served by itself and including other AMF sets, then it would only depend on the NSSF's error-handling capability to ignore those invalid TAI & AMF set subscriptions. Furthermore, by subscribing per TAIlist and AMF set, AMF needs to maintain a large number of subscription identifiers (IDs), which also has an impact on AMF's computational resource (e.g. central processing unit (CPU)) consumption and increases the signalings. For NSSF, it also needs to handle lots of subscriptions.

Thirdly, for case c), when S-NSSAI is inhomogeneous in RAN (e.g. if TA #1 supports A,B,C, TA #2 supports A), assume that a UE has: Allowed NSSAI=(A,C,D) in source AMF (S-AMF) in AMF set #3 in TA #3; and Active PDU Session with S-NSSAI=A,C,D. Also assume that NRF stores the below information: NF profile 1: AMF Set #1, Supported TAs=#1, #2, Supported S-NSSAIs=A,B,D; NF profile 2: AMF Set #2, Supported TAs=#1, #2, Supported S-NSSAIs=A,B,C. Also assume that NSSF stores the below information: supported S-NSSAI in TA #1 & AMF set #1=A,B, supported S-NSSAI in TA #2 & AMF set #1=A; supported S-NSSAI in TA #1 & AMF set #2=A,B,C, supported S-NSSAI in TA #2 & AMF set #2=A.

Then, when the UE moves to TA #1, if the S-AMF queries the NRF which responds with NF profile 1 and profile 2, then the S-AMF cannot correctly select AMF set #2 as the target AMF set, which may be called the third problem. This is because the S-AMF cannot really tell, from the NRF data, which AMF would be the best, since both AMF set #1 and AMF set #2 would support A,C or A,D, so that the S-AMF could pick any one of the two AMF sets. But the problem is that the RAN only supports A,C. In this case, querying NSSF can get the correct target AMF set #2 which can serve the UE's Allowed NSSAI A,C and TAI.

In another scenario, also assume that a UE is in AMF Set #3 and TA #3 and is moving to TA #1. The S-AMF in AMF Set #3 now needs to select a target AMF (T-AMF). Assume that the UE has: Allowed S-NSSAI=(A,C,D); and Active PDU Session with S-NSSAI=D, or C. Also assume that NRF stores the below information: NF profile 1: AMF Set #1, Supported TAs=#1, #2, Supported S-NSSAIs=A,B,D; NF profile 2: AMF Set #2, Supported TAs=#1, #2, Supported S-NSSAIs=A,B,C.

Then, if the S-AMF in AMF Set #3 makes a query to the NRF and asks for AMFs supporting TA #1, the NRF will provide the above two NF profiles in the reply to the S-AMF. In this case, no matter the active PDU Session has S-NSSAI=D or C, the S-AMF can handle it correctly, since the S-AMF will get both AMF set #1 and AMF set #2, and can decide which AMF set can best serve the PDU session with the activated user plane (UP).

However, if the S-AMF queries the NSSF, it will cause the failure of PDU session D in a case where the active PDU session has S-NSSAI=D, which may also be called the third problem. This is because if the S-AMF queries the NSSF with requestedNSSAI=A,C,D, then only one AMF set #2 can be responded from the NSSF since the NSSF stores the supported S-NSSAIs per TAI1 & AMF set #2 which can best match the requestedNSSAI=A,C. Consequently, the S-AMF has no choice but to select AMF set #2. This inappropriate selection result is due to that the NSSF has no knowledge about the active PDU sessions and does not know the priorities about the S-NSSAIs.

In view of the above two scenarios, the serving AMF does not know the overall network slice deployment and thus cannot correctly decide when to query NRF and when to query NSSF to get an exactly correct target AMF set and try best to keep the PDU sessions survive. In addition, in N2 handover procedure, if the source AMF queries NSSF, caches the NSSelection result, and subscribes a notification for the target AMF set and target TAI, this means an AMF can subscribe for other TAs served by other AMFs. Then, the AMF has the same first and second problems as described above.

The present disclosure proposes an improved solution for facilitating network slice selection. Hereinafter, the solution will be described in detail with reference to FIGS. 4-18.

Figure 4:
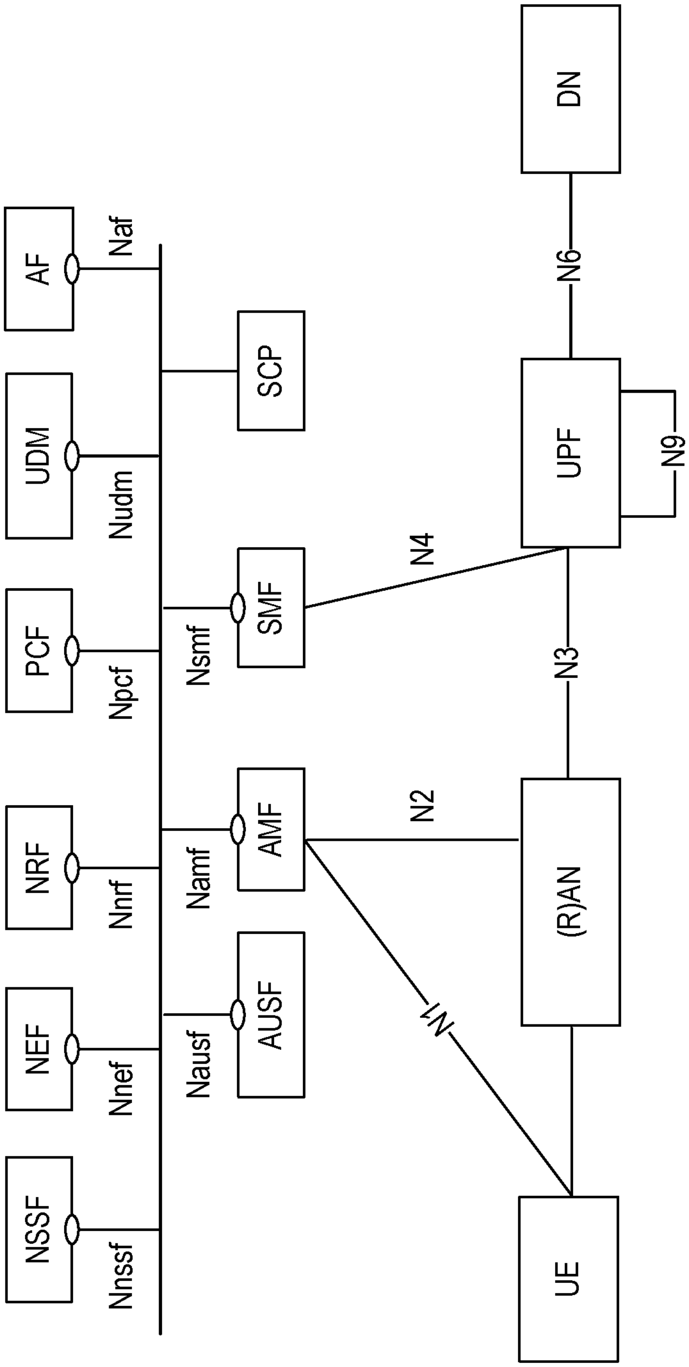
FIG. 4 is a diagram illustrating an exemplary communication system into which an embodiment of the disclosure is applicable.

FIG. 4 is a diagram illustrating an exemplary communication system into which an embodiment of the disclosure is applicable. As shown, the communication system comprises a user equipment (UE), a (radio) access network ((R)AN), a user plane function (UPF), a data network (DN), an authentication server function (AUSF), an access and mobility management function (AMF), a session management function (SMF), a service communication proxy (SCP), a network slice selection function (NSSF), a network exposure function (NEF), a network repository function (NRF), a policy control function (PCF), a unified data management (UDM) and an application function (AF). The functional description of the above entities is specified in clause 6 of 3GPP TS 23.501 V17.1.1, which is incorporated herein by reference in its entirety.

Note that within the context of this disclosure, the term the terminal device may also be referred to as, for example, device, access terminal, UE, mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device (or UE) may represent a machine or other device that performs monitoring and/or measurements, and transmits the results of such monitoring and/or measurements to another terminal device (or UE) and/or a network equipment. In this case, the terminal device (or UE) may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

Figure 5:
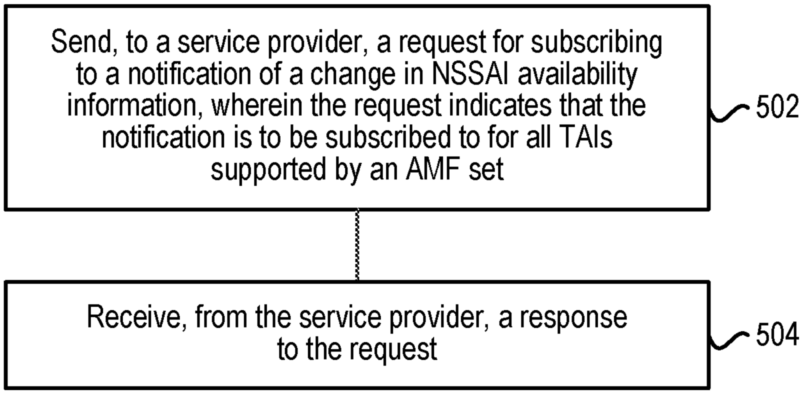
FIG. 5 is a flowchart illustrating a method performed by a service consumer according to an embodiment of the disclosure.

FIG. 5 is a flowchart illustrating a method performed by a service consumer according to an embodiment of the disclosure. Although the service consumer is described here by taking an AMF as an example, any other network entity or network node having similar functionality as the AMF may act as the service consumer. Note that the network entity (or network node) mentioned in this document may be implemented either as a network element on a dedicated hardware, as a software instance running on a dedicated hardware, or as a virtualized function instantiated on an appropriate platform, e.g. on a cloud infrastructure. At block 502, the service consumer sends, to a service provider, a request for subscribing to a notification of a change in NSSAI availability information. The request indicates that the notification is to be subscribed to for all TAIs supported by an AMF set. Although the service provider is described here by taking an NSSF as an example, any other network entity or network node having similar functionality as the NSSF may act as the service provider. The NSSAI availability information may indicate which S-NSSAI(s) are available or restricted for a certain object (e.g. TA, PLMN, or the like). As a first option, the service consumer may be an AMF in the AMF set. As a second option, the service consumer may be an AMF in another AMF set different than the AMF set. For example, the request may comprise an indicator indicating that the notification is to be subscribed to for all TAIs supported by the AMF set. Note that any other suitable indication methods (e.g. implicit indication) may also be used.

Subscribing all TAIs supported by the AMF set is based on the following two considerations. Firstly, since all the AMFs within the same AMF set will cover the same area, an AMF (acting as the service consumer) just needs to subscribe all the TAIs which it served. Then there is no need to subscribe based on each TAI or TAIlist. As a result, the notification can be subscribed based on AMF level. Because the NSSF (acting as the service provider) always stores a subscription based on TAI, S-NSSAIs and AMF set, no matter the AMF subscribes based on TAI & AMF set or only based on AMF set, there is no impact on the NSSF.

Secondly, especially when NSSF local policy changes per PLMN level, it needs to notify all the TAIs. Thus, there is no need for the AMF to subscribe based on TAI, and the AMF just needs to subscribe based on AMF set level. The NSSF knows which TAI is changed and can just notify the AMF for the corresponding TAI or notify the AMF on PLMN level if it is valid for all the TAIs.

At block 504, the service consumer receives, from the service provider, a response to the request. For example, depending on the success or failure of the subscription operation, different response may be received as described in e.g. section 5.3.2.3.1 of 3GPP TS 29.531 V17.0.0. With the method of FIG. 5, it is possible to prevent the service consumer from making the subscription time and again based on new TAIs thereby simplifying the subscription operation and optimizing the signaling.

Figure 6:
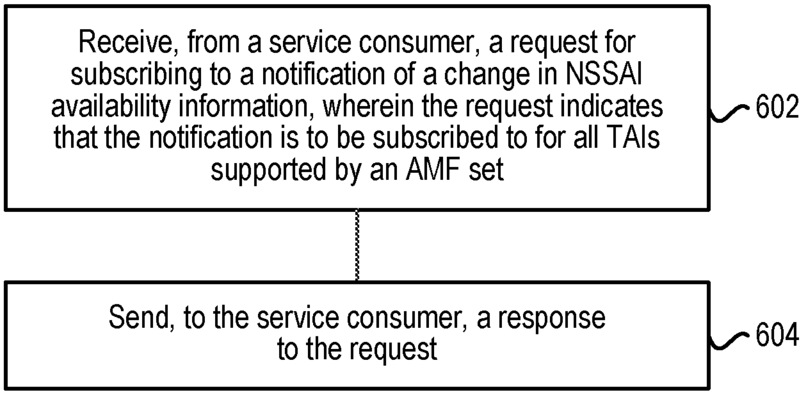
FIG. 6 is a flowchart illustrating a method performed by a service provider according to an embodiment of the disclosure.

FIG. 6 is a flowchart illustrating a method performed by a service provider according to an embodiment of the disclosure. Although the service provider is described here by taking an NSSF as an example, any other network entity or network node having similar functionality as the NSSF may act as the service provider. At block 602, the service provider receives, from a service consumer, a request for subscribing to a notification of a change in NSSAI availability information. The request indicates that the notification is to be subscribed to for all TAIs supported by an AMF set. Although the service consumer is described here by taking an AMF as an example, any other network entity or network node having similar functionality as the AMF may act as the service consumer. At block 604, the service provider sends, to the service consumer, a response to the request. Blocks 602 and 604 correspond to blocks 502 and 504 respectively and their details are omitted here for brevity. With the method of FIG. 6, it is possible to prevent the service consumer from making the subscription time and again based on new TAIs thereby simplifying the subscription operation and optimizing the signaling.

As an exemplary implementation for the methods of FIGS. 5 and 6, a new attribute may be added to indicate that AMF subscribes all the TAIs which the AMF served. With this indication, NSSF ignores the taiRangeList or taiList. In this way, AMF subscribes the NSSAIAvailabilityInfo on AMF set level without triggering the Subscribe Operation on TAI or TAIlist level. The first and second problems described above may be solved such that the subscribe operation can be simplified in different cases and the signaling can be optimized. As an example, the AMF can subscribe the event after the first time updating the NSSF with the S-NSSAIs the AMF supports per TA. For the NSSF, in the following Update operation with PATCH request to update a new TAI, there is no need for the NSSF to notify this new TAI to the AMF which performs the update. As another example, for inter-AMF handover, the source AMF can also subscribe the event of target AMF sets, without considering the target TAI.

According to the above solution, 3GPP TS 29.531 V17.0.0 is suggested to be modified as below, wherein the changes are highlighted with underlines.

6.2.6.2.8 Type: NssfEventSubscriptionCreateData

TABLE 6.2.6.2.8-1

Definition of type NssfEventSubscriptionCreateData

| Attribute name | Data type | P | Cardinality | Description | Applicability |
|---|---|---|---|---|---|
| nfNssaiAvailabilityUri | Uri | M | 1 | Identifies the recipient of notifications sent by the NF service consumer (e.g. AMF) for this subscription | |
| taiList | array(Tai) | M | 0 . . . N | Identifies the TAIs supported by the NF service consumer (e.g. AMF).(NOTE) | |
| event | NssfEventType | M | 1 | Describes the event to be subscribed for this subscription. | |
| expiry | DateTime | O | 0 . . . 1 | This IE may be included by the NF service consumer. When present, this IE shall represent the suggested time after which the subscription becomes invalid. | |
| amfSetId | string | O | 0 . . . 1 | This IE may be included to identify a specific AMF Set for which this subscription applies.<br>When present, this IE shall be constructed from PLMN-ID (i.e. three decimal digits MCC and two or three decimal digits MNC), AMF Region Id (8 bit), and AMF Set Id (10 bit).<br>Pattern: '^[0-9]{3}-[0-9]{2-3}-[A-Fa-f0-9]{2}-[0-3][A-Fa-f0-9]{2}$' | |
| taiRangeList | array(TaiRange) | O | 1 . . . N | Identifies a list of TAI ranges supported by the NF service consumer (e.g. AMF).<br>The NF service consumer shall only include this IE when it knows that the NSSF supports the "ONSSAI" feature.(NOTE) | ONSSAI |
| supportedFeatures | SupportedFeatures | C | 0 . . . 1 | This IE shall be present if at least one optional feature defined in clause 6.2.8 is supported. | |
| <u>subsToAllTais</u> | <u>boolean</u> | <u>O</u> | <u>0 . . . 1</u> | <u>This IE may be included by the NF service consumer. When present, this IE represent that subscribe all the TAIs the AMFs within the amfSetId supported.</u> | |

(NOTE):
The taiList attribute shall only be set to an empty array if the NSSF supports the "ONSSAI" feature. A NF service consumer (e.g. AMF) may provide both taiRangeList and taiList attributes, to carry individual TAI(s) in the taiList attribute and ranges of TAIs in the taiRangeList attribute.

Figure 7:
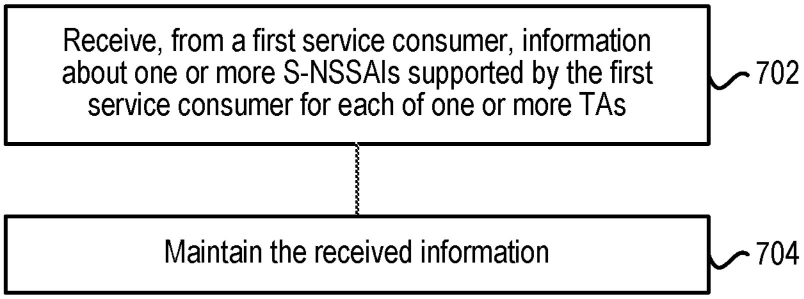
FIG. 7 is a flowchart illustrating a method performed by an NRF according to an embodiment of the disclosure.

FIG. 7 is a flowchart illustrating a method performed by an NRF according to an embodiment of the disclosure. At block 702, the NRF receives, from a first service consumer, information about one or more S-NSSAIs supported by the first service consumer for each of one or more TAs. Although the service consumer is described here by taking an AMF as an example, any other network entity or network node having similar functionality as the AMF may act as the service consumer. In the case of AMF, since information about S-NSSAI(s) supported by the first AMF for each of one or more TAs are received, the NRF can have information about S-NSSAI(s) per AMF & TA. Although the singular form is used for describing the first service consumer, it can also cover the case where there are a plurality of first service consumers. That is, the receiving of the information at block 702 and the maintaining of the received information at block 704 described later may be performed for each of the plurality of first service consumers.

For example, the received information may comprise: one or more TAIs identifying the one or more TAs; and the one or more S-NSSAIs supported by the first service consumer for each of the one or more TAs. In the case where the number of the one or more TAIs is more than one, the more than one TAI may be represented by a list of multiple TAIs or a list of one or more TAI ranges.

At block 704, the NRF maintains the received information. For example, the received information may be stored by the NRF. With the method of FIG. 7, it is possible to appropriately implement the query of target service consumer(s) by always querying the NRF.

Figure 8:
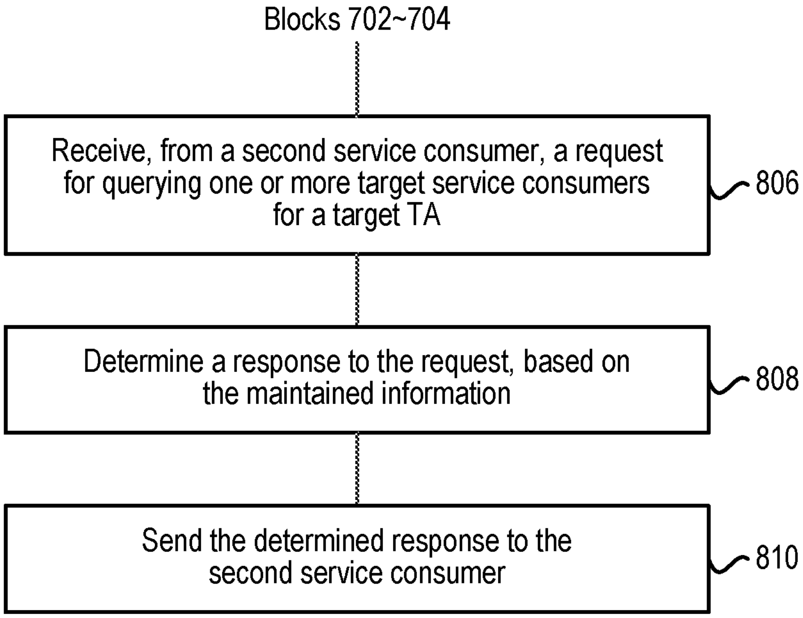
FIG. 8 is a flowchart illustrating a method performed by an NRF according to another embodiment of the disclosure.

FIG. 8 is a flowchart illustrating a method performed by an NRF according to another embodiment of the disclosure. As shown, the method comprises blocks 702-704 described above and blocks 806-810. Blocks 702-704 have been described above and their details are omitted here for brevity. At block 806, the NRF receives, from a second service consumer, a request for querying one or more target service consumers for a target TA. That is, target service consumer(s) can be queried from the NRF based still on TAI. At block 808, the NRF determines a response to the request, based on the maintained information. For example, NF profile(s) corresponding to the target TA may be determined as the response to the request. At block 810, the NRF sends the determined response to the second service consumer. For example, in the case where the service consumer is an AMF, the NF profile(s) determined as the response may comprise supported S-NSSAI(s) per AMF & TA, so that the query of target service consumer(s) can be appropriately achieved by always querying the NRF.

Figure 9:
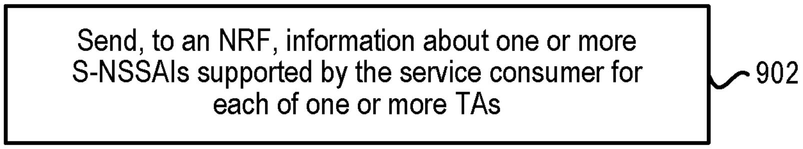
FIG. 9 is a flowchart illustrating a method performed by a service consumer according to an embodiment of the disclosure.

FIG. 9 is a flowchart illustrating a method performed by a service consumer according to an embodiment of the disclosure. Although the service consumer is described here by taking an AMF as an example, any other network entity or network node having similar functionality as the AMF may act as the service consumer. At block 902, the service consumer sends, to an NRF, information about one or more S-NSSAIs supported by the service consumer for each of one or more TAs. The one or more S-NSSAIs supported by the service consumer for each of one or more TAs may be determined firstly. For example, for a given TA, the one or more S-NSSAIs may be determined as an intersection of the RAN supported S-NSSAI(s) for the TA and the supported S-NSSAI(s) configured in the service consumer for the TA. The sent information may comprise: one or more TAIs identifying the one or more TAs; and the one or more S-NSSAIs supported by the service consumer for each of the one or more TAs. In the case where the number of the one or more TAIs is more than one, the more than one TAI may be represented by a list of multiple TAIs or a list of one or more TAI ranges. With the method of FIG. 9, it is possible to appropriately implement the query of target service consumer(s) by always querying the NRF.

As an exemplary implementation for the methods of FIGS. 7 and 9, AMF updates the NRF with the S-NSSAIs the AMF supports per TA, similar as reporting to NSSF. As a result, NRF is enhanced with providing the mapping between TAIs and S-NSSAIs. In this way, the third problem described above with respect to target AMF selection in N2 handover procedure when slices are deployed to be inhomogeneous may be solved. Note that this solution may cause some duplicated functionality in both NRF and NSSF. In addition, NRF has no authorized NSSAI availability information.

According to the above solution, the following new attributes are suggested to be added into AmfInfo defined in 3GPP TS 29.510 V17.2.0, wherein the changes are highlighted with underlines.

Type: SupportedNssaiAvailabilityData

TABLE 6.2.6.2.3-1

Definition of type SupportedNssaiAvailabilityData

| Attribute name | Data type | P | Cardinality | Description | Applicability |
|---|---|---|---|---|---|
| tai | Tai | M | 1 | This IE shall contain the identifier of the Tracking Area | |
| supportedSnssaiList | array(ExtSnssai) | M | 1 . . . N | This IE shall contain the S-NSSAI(s) supported by the AMF for the TA. | |
| taiList | array(Tai) | O | 1 . . . N | When present, this IE shall contain additional TAIs with the same list of supported S-NSSAIs. (NOTE) | |
| taiRangeList | array(TaiRange) | O | 1 . . . N | When present, this IE shall contain range(s) of TAIs with the same list of supported S-NSSAIs. (NOTE) | |

Figure 10:
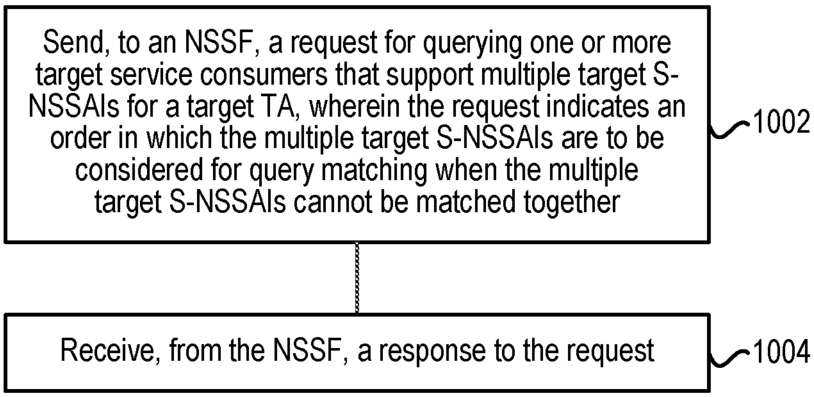
FIG. 10 is a flowchart illustrating a method performed by a service consumer according to an embodiment of the disclosure.

FIG. 10 is a flowchart illustrating a method performed by a service consumer according to an embodiment of the disclosure. Although the service consumer is described here by taking an AMF as an example, any other network entity or network node having similar functionality as the AMF may act as the service consumer. At block 1002, the service consumer sends, to an NSSF, a request for querying one or more target service consumers that support multiple target S-NSSAIs for a target TA. The request indicates an order in which the multiple target S-NSSAIs are to be considered for query matching when the multiple target S-NSSAIs cannot be matched together. For example, the order may be based on which PDU session(s) served by the service consumer are currently active. The priority of an S-NSSAI corresponding to an active PDU session may be higher than that of an S-NSSAI corresponding to an inactive PDU session. As a first option, the order may be indicated by an order in which the multiple target S-NSSAIs are sorted in the request. As a second option, the request may comprise multiple indicators each of which indicates a priority of one of the multiple target S-NSSAIs that is to be considered for query matching when the multiple target S-NSSAIs cannot be matched together. Thus, the order may be indicated by the priorities of the multiple target S-NSSAIs. For example, the lower value an indicator has, the higher priority a target S-NSSAI may have.

At block 1004, the service consumer receives, from the NSSF, a response to the request. For example, if there exist service consumer(s) matching the multiple target S-NSSAIs together, the response may comprise information about such service consumer(s). On the other hand, if there does not exist any service consumer matching all the multiple target S-NSSAIs together, the response may comprise information about service consumer(s) matching a maximum number of target S-NSSAIs having highest priorities among the multiple target S-NSSAIs. With the method of FIG. 10, it is possible to appropriately implement the query of target service consumer(s) by always querying the NSSF.

Figure 11:
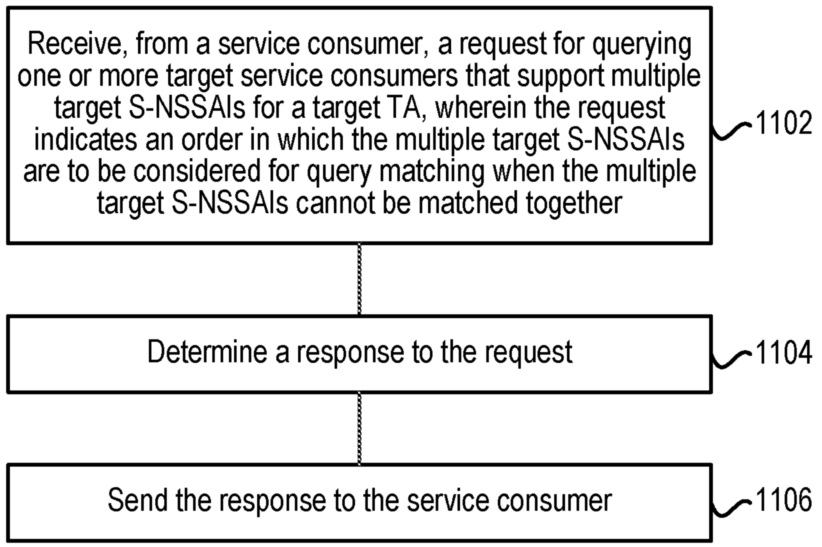
FIG. 11 is a flowchart illustrating a method performed by an NSSF according to an embodiment of the disclosure.

FIG. 11 is a flowchart illustrating a method performed by an NSSF according to an embodiment of the disclosure. At block 1102, the NSSF receives, from a service consumer, a request for querying one or more target service consumers that support multiple target S-NSSAIs for a target TA. The request indicates an order in which the multiple target S-NSSAIs are to be considered for query matching when the multiple target S-NSSAIs cannot be matched together. Although the service consumer is described here by taking an AMF as an example, any other network entity or network node having similar functionality as the AMF may act as the service consumer. As a first option, the order may be indicated by an order in which the multiple target S-NSSAIs are sorted in the request. As a second option, the request may comprise multiple indicators each of which indicates a priority of one of the multiple target S-NSSAIs that is to be considered for query matching when the multiple target S-NSSAIs cannot be matched together. Thus, the order may be indicated by the priorities of the multiple target S-NSSAIs. For example, the lower value an indicator has, the higher priority a target S-NSSAI may have.

At block 1104, the NSSF determines a response to the request. For example, if there exist service consumer(s) matching the multiple target S-NSSAIs together, the NSSF may determine such service consumer(s) as the one or more target service consumers. If there does not exist any service consumer matching the multiple target S-NSSAIs together, the NSSF may determine, as the one or more target service consumers, service consumer(s) matching a maximum number of target S-NSSAIs having highest priorities among the multiple target S-NSSAIs. That is, the response may be determined based on the indicated order. The response may comprise information about the determined service consumer(s). At block 1106, the NSSF sends the response to the service consumer. With the method of FIG. 11, it is possible to appropriately implement the query of target service consumer(s) by always querying the NSSF.

Figure 12:
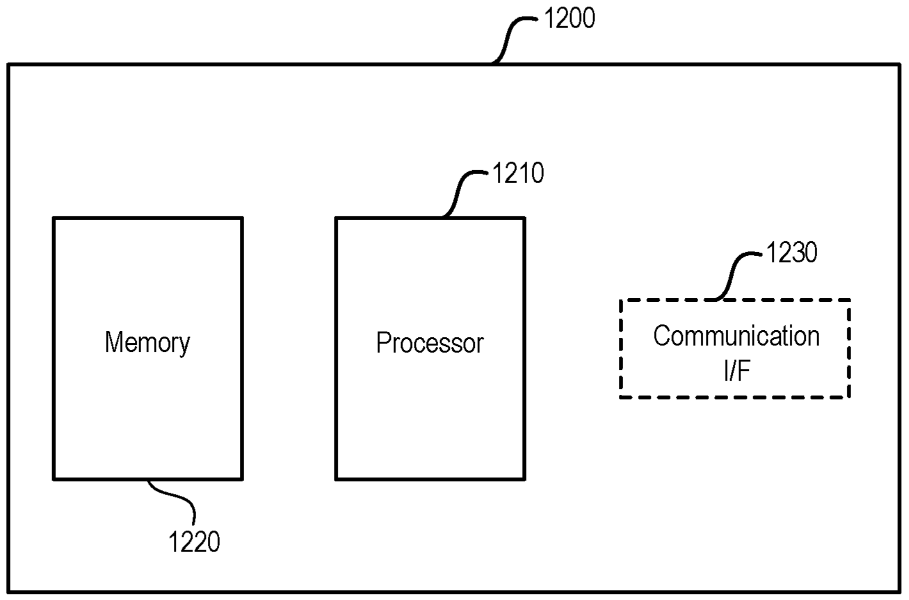
FIG. 12 is a block diagram showing an apparatus suitable for use in practicing some embodiments of the disclosure.

As an exemplary implementation for the methods of FIGS. 11 and 12, AMF may always query NSSF by adjusting the order of the S-NSSAIs based on the active PDU sessions in requestedNssai. For example, in the scenario mentioned above with respect to the third problem, if the only Active PDU Session has S-NSSAI=D, then the AMF may query the NSSF with requestedNSSAI=D,A,C. Then the NSSF can perform best match based on the order of the requested S-NSSAIs if the NSSF cannot match all the requested S-NSSAIs.

Alternatively, AMF may always query NSSF by adding an indication for each requested S-NSSAIs. Then NSSF has the knowledge of the priority of each S-NSSAI and can perform best match based on the priorities of the requested S-NSSAIs if the NSSF cannot match all the requested S-NSSAIs. According to this solution, 3GPP TS 29.531 V17.0.0 is suggested to be modified as below, wherein the changes are highlighted with underlines.

TABLE 6.1.6.2.10-1

Definition of type SliceInfoForRegistration

| Attribute name | Data type | P | Cardinality | Description |
|---|---|---|---|---|
| subscribedNssai | array(SubscribedSnssai) | C | 1 . . . N | This IE shall be included during the initial registration procedure or during mobility registration procedure in 5GS. This IE may also be included during EPS to 5GS handover procedure/Idle mode Mobility Registration Procedure using N26 interface or the handover procedure within 5GS. When present, this IE shall contain the list of subscribed S-NSSAIs along with an indication for each S-NSSAI if it is a default S-NSSAI. |
| requestedNssai | array(Snssai) | O | 1 . . . N | This IE may contain the set of S-NSSAIs requested by the UE.<br>During EPS to 5GS handover procedure using N26 interface, this IE may contain the set of S-NSSAIs in the serving PLMN obtained from PGW + SMF in VPLMN, or mapped from the set of S-NSSAIs obtained from PGW + SMF in the HPLMN.<br>During handover procedure within 5GS, this IE may contain the set of S-NSSAIs in the serving PLMN obtained from the source AMF, or mapped from the set of HPLMN S-NSSAIs obtained from source AMF. |
| priority | array(priority) | | | This IE may contain the priority of S-NSSAIs in the requestedNssai.<br>Priority indicate the order of requested S-NSSAIs. It's used for AMF set selection, matching the attributes of requestedNssai based on the priority of S-NSSAI if NSSF can not match all requested S-NSSAIs.; lower values indicate a higher priority. |

FIG. 12 is a block diagram showing an apparatus suitable for use in practicing some embodiments of the disclosure. For example, any one of the service consumer, the service provider, the NRF and the NSSF described above may be implemented through the apparatus 1200. As shown, the apparatus 1200 may include a processor 1210, a memory 1220 that stores a program, and optionally a communication interface 1230 for communicating data with other external devices through wired and/or wireless communication.

The program includes program instructions that, when executed by the processor 1210, enable the apparatus 1200 to operate in accordance with the embodiments of the present disclosure, as discussed above. That is, the embodiments of the present disclosure may be implemented at least in part by computer software executable by the processor 1210, or by hardware, or by a combination of software and hardware.

The memory 1220 may be of any type suitable to the local technical environment and may be implemented using any suitable data storage technology, such as semiconductor based memory devices, flash memories, magnetic memory devices and systems, optical memory devices and systems, fixed memories and removable memories. The processor 1210 may be of any type suitable to the local technical environment, and may include one or more of general purpose computers, special purpose computers, microprocessors, digital signal processors (DSPs) and processors based on multi-core processor architectures, as non-limiting examples.

Figure 13:
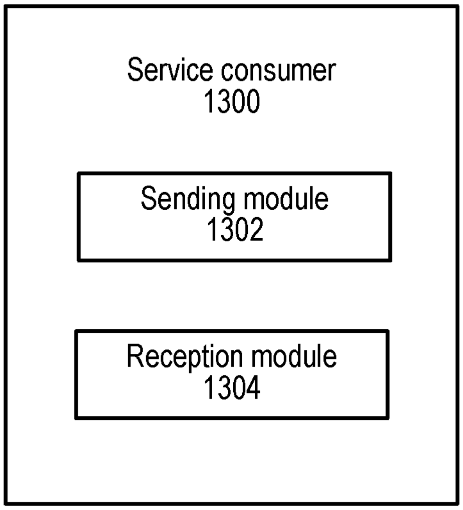
FIG. 13 is a block diagram showing a service consumer according to an embodiment of the disclosure.

FIG. 13 is a block diagram showing a service consumer according to an embodiment of the disclosure. As shown, the service consumer 1300 comprises a sending module 1302 and a reception module 1304. The sending module 1302 may be configured to send, to a service provider, a request for subscribing to a notification of a change in NSSAI availability information, as described above with respect to block 502. The request may indicate that the notification is to be subscribed to for all TAIs supported by an AMF set. The reception module 1304 may be configured to receive, from the service provider, a response to the request, as described above with respect to block 504.

Figure 14:
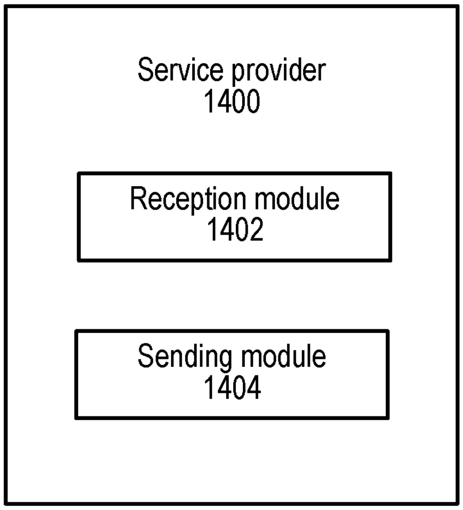
FIG. 14 is a block diagram showing a service provider according to an embodiment of the disclosure.

FIG. 14 is a block diagram showing a service provider according to an embodiment of the disclosure. As shown, the service provider 1400 comprises a reception module 1402 and a sending module 1404. The reception module 1402 may be configured to receive, from a service consumer, a request for subscribing to a notification of a change in NSSAI availability information, as described above with respect to block 602. The request may indicate that the notification is to be subscribed to for all TAIs supported by an AMF set. The sending module 1404 may be configured to send, to the service consumer, a response to the request, as described above with respect to block 604.

Figure 15:
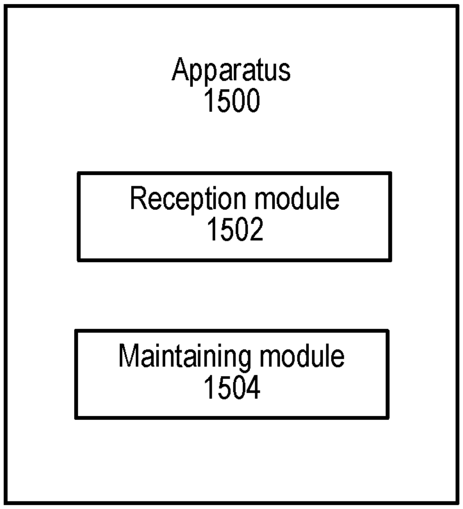
FIG. 15 is a block diagram showing an apparatus implementing an NRF according to an embodiment of the disclosure.

FIG. 15 is a block diagram showing an apparatus implementing an NRF according to an embodiment of the disclosure. As shown, the apparatus 1500 comprises a reception module 1502 and a maintaining module 1504. The reception module 1502 may be configured to receive, from a first service consumer, information about one or more S-NSSAIs supported by the first service consumer for each of one or more TAs, as described above with respect to block 702. The maintaining module 1504 may be configured to maintain the received information, as described above with respect to block 704.

Figure 16:
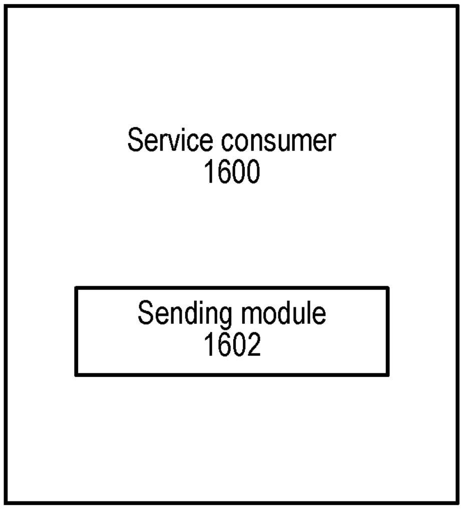
FIG. 16 is a block diagram showing a service consumer according to an embodiment of the disclosure.

FIG. 16 is a block diagram showing a service consumer according to an embodiment of the disclosure. As shown, the service consumer 1600 comprises a sending module 1602. The sending module 1602 may be configured to send, to an NRF, information about one or more S-NSSAIs supported by the service consumer for each of one or more TAs, as described above with respect to block 902.

Figure 17:
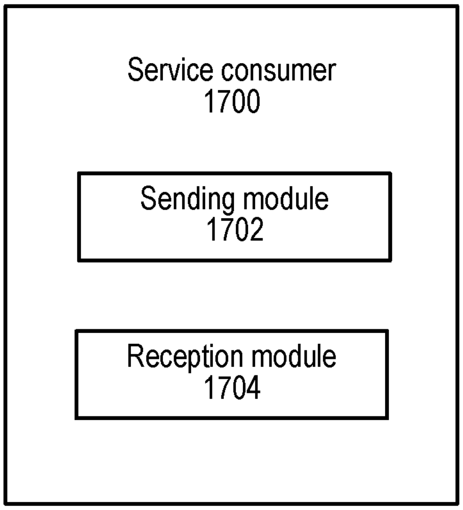
FIG. 17 is a block diagram showing a service consumer according to an embodiment of the disclosure.

FIG. 17 is a block diagram showing a service consumer according to an embodiment of the disclosure. As shown, the service consumer 1700 comprises a sending module 1702 and a reception module 1704. The sending module 1702 may be configured to send, to an NSSF, a request for querying one or more target service consumers that support multiple target S-NSSAIs for a target TA, as described above with respect to block 1002. The request may indicate an order in which the multiple target S-NSSAIs are to be considered for query matching when the multiple target S-NSSAIs cannot be matched together. The reception module 1704 may be configured to receive, from the NSSF, a response to the request, as described above with respect to block 1004.

Figure 18:
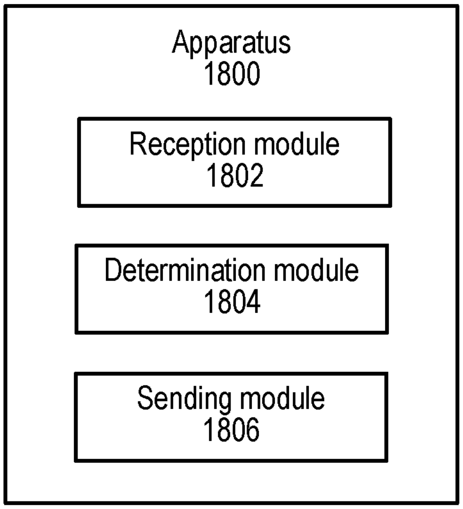
FIG. 18 is a block diagram showing an apparatus implementing an NSSF according to an embodiment of the disclosure.

FIG. 18 is a block diagram showing an apparatus implementing an NSSF according to an embodiment of the disclosure. As shown, the apparatus 1800 comprises a reception module 1802, a determination module 1804 and a sending module 1806. The reception module 1802 may be configured to receive, from a service consumer, a request for querying one or more target service consumers that support multiple target S-NSSAIs for a target TA, as described above with respect to block 1102. The request may indicate an order in which the multiple target S-NSSAIs are to be considered for query matching when the multiple target S-NSSAIs cannot be matched together. The determination module 1804 may be configured to determine a response to the request, as described above with respect to block 1104. The sending module 1806 may be configured to send the response to the service consumer, as described above with respect to block 1106. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements. It should be noted that two blocks shown in succession in the above figures may, in fact, be executed substantially concurrently, or the blocks may sometimes be executed in the reverse order, depending upon the functionality involved.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a service consumer, comprising:

sending, to a service provider, a request for subscribing to a notification of a change in network slice selection assistance information, NSSAI, availability information, wherein the request indicates that the notification is to be subscribed to for all tracking area identifiers, TAIs, supported by an access and mobility management function, AMF, set; and receiving, from the service provider, a response to the request, wherein the request comprises an indicator indicating that the notification is to be subscribed to for all TAIs supported by the AMF set.

2. The method according to claim 1, wherein the service consumer is an AMF in the AMF set.

3. The method according to claim 1, wherein the service consumer is an AMF in another AMF set different than the AMF set.

4. The method according to claim 1, wherein the service provider is a network slice selection function, NSSF.

5. A method performed by a service provider, comprising:

receiving, from a service consumer, a request for subscribing to a notification of a change in network slice selection assistance information, NSSAI, availability information, wherein the request indicates that the notification is to be subscribed to for all tracking area identifiers, TAIs, supported by an access and mobility management function, AMF, set; and sending, to the service consumer, a response to the request, wherein the request comprises an indicator indicating that the notification is to be subscribed to for all TAIs supported by the AMF set.

6. The method according to claim 5, wherein the service consumer is an AMF in the AMF set.

7. The method according to claim 5, wherein the service consumer is an AMF in another AMF set different than the AMF set.

8. The method according to claim 5, wherein the service provider is a network slice selection function, NSSF.

9. A method performed by a network repository function, NRF, comprising:

receiving, from a first service consumer, information about one or more single network slice selection assistance information, S-NSSAIs, supported by the first service consumer for each of one or more tracking areas, TAs; and maintaining the received information, wherein the information is received and maintained for each of a plurality of first service consumers.

10. The method according to claim 9, wherein the received information comprises:

one or more TA identifiers, TAIs, identifying the one or more TAs; and the one or more S-NSSAIs supported by the first service consumer for each of the one or more TAs.

11. The method according to claim 10, wherein a number of the one or more TAIs is more than one; and wherein the more than one TAI is represented by a list of multiple TAIs or a list of one or more TAI ranges.

12. The method according to claim 9, further comprising:

receiving, from a second service consumer, a request for querying one or more target service consumers for a target TA;

determining a response to the request, based on the maintained information; and sending the determined response to the second service consumer.

13. The method according to claim 12, wherein each of the first service consumer and the second service consumer is an access and mobility management function, AMF.

14. A method performed by a service consumer, comprising:

sending, to a network repository function, NRF, information about one or more single network slice selection assistance information, S-NSSAIs, supported by the service consumer for each of one or more tracking areas, Tas, wherein the service consumer is an access and mobility management function, AMF.

15. The method according to claim 14, wherein the sent information comprises:

one or more TA identifiers, TAIs, identifying the one or more TAs; and the one or more S-NSSAIs supported by the service consumer for each of the one or more TAs.

16. The method according to claim 15, wherein a number of the one or more TAIs is more than one; and wherein the more than one TAI is represented by a list of multiple TAIs or a list of one or more TAI ranges.

* * * * *